(12) United States Patent
Daudet et al.

(10) Patent No.: US 9,732,520 B2
(45) Date of Patent: Aug. 15, 2017

(54) INVERTED BRIDGING CONNECTOR

(71) Applicants: Larry Randall Daudet, Brentwood, CA (US); Jin-Jie Lin, Livermore, CA (US)

(72) Inventors: Larry Randall Daudet, Brentwood, CA (US); Jin-Jie Lin, Livermore, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 853 days.

(21) Appl. No.: 13/845,057

(22) Filed: Mar. 17, 2013

(65) Prior Publication Data

US 2014/0270916 A1  Sep. 18, 2014

(51) Int. Cl.
  *E04B 2/76* (2006.01)
  *F16B 7/04* (2006.01)

(52) U.S. Cl.
  CPC ............ *E04B 2/763* (2013.01); *F16B 7/0493* (2013.01); *Y10T 403/3906* (2015.01)

(58) Field of Classification Search
  CPC ..... E04B 2/762; E04B 2/763; E04B 2001/405
  See application file for complete search history.

(56) References Cited

U.S. PATENT DOCUMENTS

| | | |
|---|---|---|
| 529,154 A | 11/1894 | Banks |
| 719,191 A | 1/1903 | Collins |
| 992,941 A | 5/1911 | Danielson |
| 1,101,745 A | 6/1914 | Jones |
| 1,346,426 A | 7/1920 | Sherbner |
| 1,791,197 A | 2/1931 | Dickson |
| 2,365,501 A | 12/1944 | Walstrom |
| 2,873,828 A | 2/1959 | Zitomer |
| 2,900,677 A | 8/1959 | Yetter |
| 2,905,426 A | 9/1959 | Ross |
| 2,918,995 A | 12/1959 | Kruger |
| 3,083,794 A | 4/1963 | Stovail |
| 3,102,306 A | 9/1963 | Hutchinson |
| 3,126,928 A | 3/1964 | McMillan |
| 3,299,839 A | 1/1967 | Nordbak |
| 3,322,447 A | 5/1967 | Biggs |
| 3,482,369 A | 12/1969 | Burke |
| 3,490,604 A | 1/1970 | Klein |

(Continued)

FOREIGN PATENT DOCUMENTS

| | | |
|---|---|---|
| DE | 198012148 | 10/1980 |
| EP | 2395168 A1 | 12/2011 |

(Continued)

OTHER PUBLICATIONS

International Preliminary Report on Patentability by International Bureau of the Patent Cooperation Treaty (PCT), Application No. PCT/US2013/075843, Oct. 1, 2015, 8 pages, The International Bureau of WIPO, Geneva, Switzerland.

(Continued)

*Primary Examiner* — Michael P Ferguson
(74) *Attorney, Agent, or Firm* — James R. Cypher; Charles R. Cypher

(57) ABSTRACT

A connection between a wall stud, channel-shaped bridging member and connector that resists torsional forces, the connector being suited to interlock with the interior of the bridging member channel and to be fastened to the bridging member outside the channel, depending on the orientation of the bridging member.

31 Claims, 10 Drawing Sheets

(56) References Cited

U.S. PATENT DOCUMENTS

| | | |
|---|---|---|
| 3,606,227 A | 9/1971 | Klein |
| 3,653,172 A | 4/1972 | Schwartz |
| 3,778,952 A | 12/1973 | Soucy |
| 3,858,988 A | 1/1975 | Cohen |
| 3,897,163 A | 7/1975 | Holmes |
| 3,972,169 A | 8/1976 | Sheppard, Jr. |
| 4,018,020 A | 4/1977 | Sauer et al. |
| 4,027,453 A | 6/1977 | Bridge |
| 4,043,689 A | 8/1977 | Spencer |
| 4,075,810 A | 2/1978 | Zakrzewski et al. |
| 4,128,979 A | 12/1978 | Price |
| 4,140,417 A | 2/1979 | Danielsen et al. |
| 4,174,911 A | 11/1979 | Maccario et al. |
| 4,208,851 A | 6/1980 | Sauer |
| 4,235,054 A | 11/1980 | Cable et al. |
| 4,246,736 A | 1/1981 | Kovar et al. |
| 4,406,374 A | 9/1983 | Yedor |
| 4,426,822 A | 1/1984 | Gailey |
| 4,428,172 A | 1/1984 | Larsson |
| 4,448,004 A | 5/1984 | Thorsell |
| 4,464,074 A | 8/1984 | Green |
| 4,480,941 A | 11/1984 | Gild et al. |
| 4,516,874 A | 5/1985 | Yang et al. |
| 4,522,009 A | 6/1985 | Fingerson |
| 4,586,841 A | 5/1986 | Hunter |
| 4,625,415 A | 12/1986 | Diamontis |
| 4,693,047 A | 9/1987 | Menchetti |
| 4,791,766 A | 12/1988 | Egri, II |
| 4,809,476 A | 3/1989 | Satchell |
| 4,840,005 A | 6/1989 | Cochrane |
| 4,850,169 A | 7/1989 | Burkstrand et al. |
| 4,858,407 A | 8/1989 | Smolik |
| 4,864,791 A | 9/1989 | Platt |
| 4,912,894 A | 4/1990 | Platt |
| 4,914,878 A | 4/1990 | Tamaki et al. |
| 4,916,877 A | 4/1990 | Platt |
| 4,951,436 A | 8/1990 | Burkstrand et al. |
| 5,092,100 A | 3/1992 | Lambert et al. |
| 5,104,252 A | 4/1992 | Colonias et al. |
| 5,127,760 A | 7/1992 | Brady |
| 5,155,962 A | 10/1992 | Burkstrand et al. |
| 5,189,857 A | 3/1993 | Herren |
| 5,274,973 A | 1/1994 | Liang |
| 5,287,664 A | 2/1994 | Schiller |
| 5,325,651 A | 7/1994 | Meyer et al. |
| 5,363,622 A | 11/1994 | Sauer |
| 5,403,110 A | 4/1995 | Sammann |
| 5,446,969 A | 9/1995 | Terenzoni |
| 5,555,694 A | 9/1996 | Commins |
| 5,600,926 A | 2/1997 | Ehrlich |
| 5,603,580 A | 2/1997 | Leek et al. |
| 5,605,024 A | 2/1997 | Sucato et al. |
| 5,632,128 A | 5/1997 | Agar |
| 5,664,392 A | 9/1997 | Mucha |
| 5,669,198 A | 9/1997 | Ruff |
| 5,671,580 A | 9/1997 | Chou |
| 5,682,935 A | 11/1997 | Bustamante |
| 5,697,725 A | 12/1997 | Ballash et al. |
| 5,720,138 A | 2/1998 | Johnson |
| 5,784,850 A | 7/1998 | Elderson |
| 5,876,006 A | 3/1999 | Sharp |
| 5,899,041 A | 5/1999 | Durin |
| 5,904,023 A | 5/1999 | diGirolamo |
| 5,921,411 A | 7/1999 | Merl |
| 5,943,838 A | 8/1999 | Madsen |
| 5,964,071 A | 10/1999 | Sato |
| 6,021,618 A | 2/2000 | Elderson |
| 6,101,780 A | 8/2000 | Kreidt |
| 6,164,028 A | 12/2000 | Hughes |
| 6,199,336 B1 | 3/2001 | Poliquin |
| 6,242,698 B1 | 6/2001 | Baker, III et al. |
| 6,260,318 B1 | 7/2001 | Herren |
| 6,290,214 B1 | 9/2001 | DeSouza |
| 6,295,781 B1 | 10/2001 | Thompson |
| 6,301,854 B1 | 10/2001 | Daudet et al. |
| 6,315,137 B1 | 11/2001 | Mulford |
| 6,418,695 B1 | 7/2002 | Daudet |
| D463,575 S | 9/2002 | Daudet |
| 6,523,321 B1 | 2/2003 | Leek et al. |
| 6,578,335 B2 | 6/2003 | Poliquin |
| 6,644,603 B2 | 11/2003 | Bailleux |
| 6,662,520 B1 | 12/2003 | Nelson |
| 6,688,069 B2 | 2/2004 | Zadeh |
| 6,694,695 B2 | 2/2004 | Collins |
| 6,701,689 B2 | 3/2004 | diGirolamo |
| 6,702,270 B1 | 3/2004 | Reschke |
| 6,708,460 B1 | 3/2004 | Elderson |
| 6,739,562 B2 | 5/2004 | Rice |
| 6,792,733 B2 | 9/2004 | Wheeler |
| 6,920,734 B2 | 7/2005 | Elderson |
| 7,017,310 B2 | 3/2006 | Brunt |
| 7,021,021 B2 | 4/2006 | Saldana |
| 7,104,024 B1 | 9/2006 | diGirolamo et al. |
| 7,159,369 B2 | 1/2007 | Elderson |
| 7,168,219 B2 | 1/2007 | Elderson |
| 7,174,690 B2 | 2/2007 | Zadeh |
| D558,039 S | 12/2007 | Skinner |
| 7,334,372 B2 | 2/2008 | Evans et al. |
| D573,873 S | 7/2008 | Wall |
| 7,398,621 B2 | 7/2008 | Banta |
| 7,503,150 B1 | 3/2009 | diGirolamo |
| 7,520,100 B1 | 4/2009 | Herrman |
| 7,559,519 B1 | 7/2009 | Dragic |
| 7,596,921 B1 | 10/2009 | diGirolamo |
| 7,634,889 B1 | 12/2009 | diGirolamo et al. |
| 7,739,850 B2 | 6/2010 | Daudet |
| 7,836,657 B1 | 11/2010 | diGirolamo |
| 7,955,027 B2 | 6/2011 | Nourian et al. |
| 8,011,160 B2 | 9/2011 | Rice |
| D648,249 S | 11/2011 | Noble et al. |
| 8,083,187 B2 | 12/2011 | Bernard et al. |
| D657,891 S | 4/2012 | Jones |
| 8,167,250 B2 | 5/2012 | White |
| 8,205,402 B1 | 6/2012 | diGirolamo |
| 8,225,581 B2 | 7/2012 | Strickland et al. |
| D667,249 S | 9/2012 | London |
| D667,718 S | 9/2012 | Preda |
| 8,387,321 B2 | 3/2013 | diGirolamo et al. |
| 8,528,292 B2 | 9/2013 | Morey |
| D692,742 S | 11/2013 | Lawson et al. |
| D692,746 S | 11/2013 | Lawson et al. |
| 9,109,361 B2 | 8/2015 | Daudet et al. |
| 2002/0059773 A1 | 5/2002 | Elderson |
| 2003/0009980 A1 | 1/2003 | Shahnazarian |
| 2003/0037494 A1 | 2/2003 | Collins |
| 2003/0089053 A1 | 5/2003 | Elderson |
| 2003/0145537 A1 | 8/2003 | Bailey |
| 2003/0167722 A1 | 9/2003 | Klein et al. |
| 2007/0251186 A1 | 11/2007 | Rice |
| 2010/0031601 A1 | 2/2010 | Lin |
| 2010/0126103 A1 | 5/2010 | diGirolamo et al. |
| 2011/0154770 A1 | 6/2011 | Friis |
| 2013/0104490 A1 | 5/2013 | Daudet et al. |
| 2014/0047792 A1 | 2/2014 | Daudet et al. |

FOREIGN PATENT DOCUMENTS

| | | |
|---|---|---|
| JP | 57187316 U | 11/1982 |
| JP | 1986-020809 | 2/1986 |

OTHER PUBLICATIONS

"Construction Dimensions", Apr. 2012, cover page and Simpson Strong-Tie/SUBH advertisement page, SFCFS12-E, Association of the Wall and Ceiling Industry (AWCI), USA.

"SUBH/MSUBH: Bridging Connectors for Cold-Formed Steel Stud Construction", Simpson Strong-Tie Company flier, Apr. 1, 2012, 2 pages, S-SUBHMSUBH12, Simpson Strong-Tie Company, Inc., Pleasanton, CA, USA.

"Wall Bridging Detail". NuconSteel Product Catalog, 2003, front cover, table of contents, p. 34. NuconSteel., USA.

"Double Deep-Leg Track", "Bridge Clip Installation", "BC600 & BC800 Installation", "BridgeBar", "BridgeClip", "BC600 or

(56) References Cited

OTHER PUBLICATIONS

BC800". The Steel Network, Inc. Product Catalog, Jan. 2004, front cover, p. 11, 27, 49. Steel Network, Inc., USA.
"Bridging, Bracing & Backing: Spazzer 5400 Spacer Bar (SPZS), Bar Guard (SPBG) & Grommet (SPGR)". Clip Express Product Catalog: Clips, Connectors & Framing Hardware, Apr. 2012, p. 77. Clark Dietrich Building Systems, USA.
"Metal-Lite Products". Metal Lite website, metal-lite.net. Accessed Sep. 20, 2013, one page. Metal Lite 2012, USA.
"Mantisgrip Product Catalog 2012". Catalog, 2012, 10 pages and cover. Mantisgrip 2012, USA.
U.S. Appl. No. 13/802,676, "Teardrop and Offset Notch Bridging Connector". Unpublished (filed Mar. 13, 2013), (Daudet, Larry R. and Oellerich, Paul H., Applicants), application p. 1-42; drawings p. 1-13.
Communication Pursuant to Article 94(3) EPC and Examination Report, Application No. 13,824,697.0, dated Jan. 11, 2017, 6 pages, European Patent Office, Netherlands.
European Search Report, Application No. EP15153720, dated Dec. 15, 2016, 8 pages, European Patent Office, Germany.
Examination Report No. 1 for Standard Patent Application and Report Details, Application No. 2013383340, dated Feb. 2, 2017, 3 pages, IP Australia.
Examination Report No. 1 for Standard Patent Application and Report Details, Application No. 2013384149, dated Feb. 13, 2017, 3 pages, IP Australia.
International Preliminary Report on Patentability, Application No. PCT/US2013/075857, dated Sep. 24, 2015, 15 pages including cover, International Bureau of WIPO, Switzerland.
Invitation to Pay Additional Fees and Communication Relating to the Results of the Partial International Search, Application No. PCT/US2013/075857, dated Apr. 7, 2014, 7 pages, International Searching Authority, Netherlands.
"U-Channel Bridging Connectors for Cold-Formed Steel Construction", Simpson Strong-Tie Product Flyer, Sep. 1, 2012, front and back cover pages and pp. 2-11, vol. F-SUBHMSUBH12, Simpson Strong-Tie Company, Inc., Pleasanton, CA.

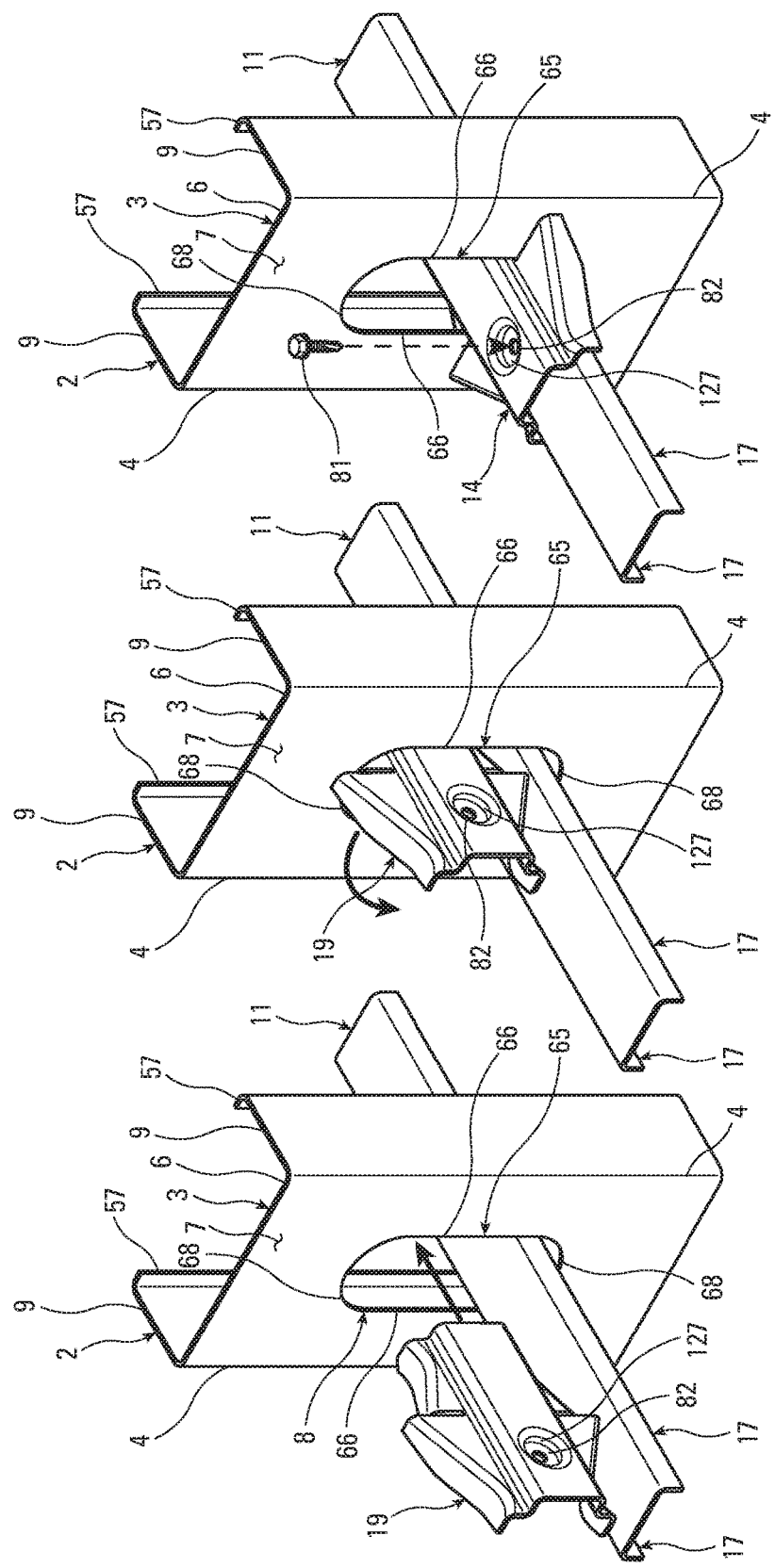

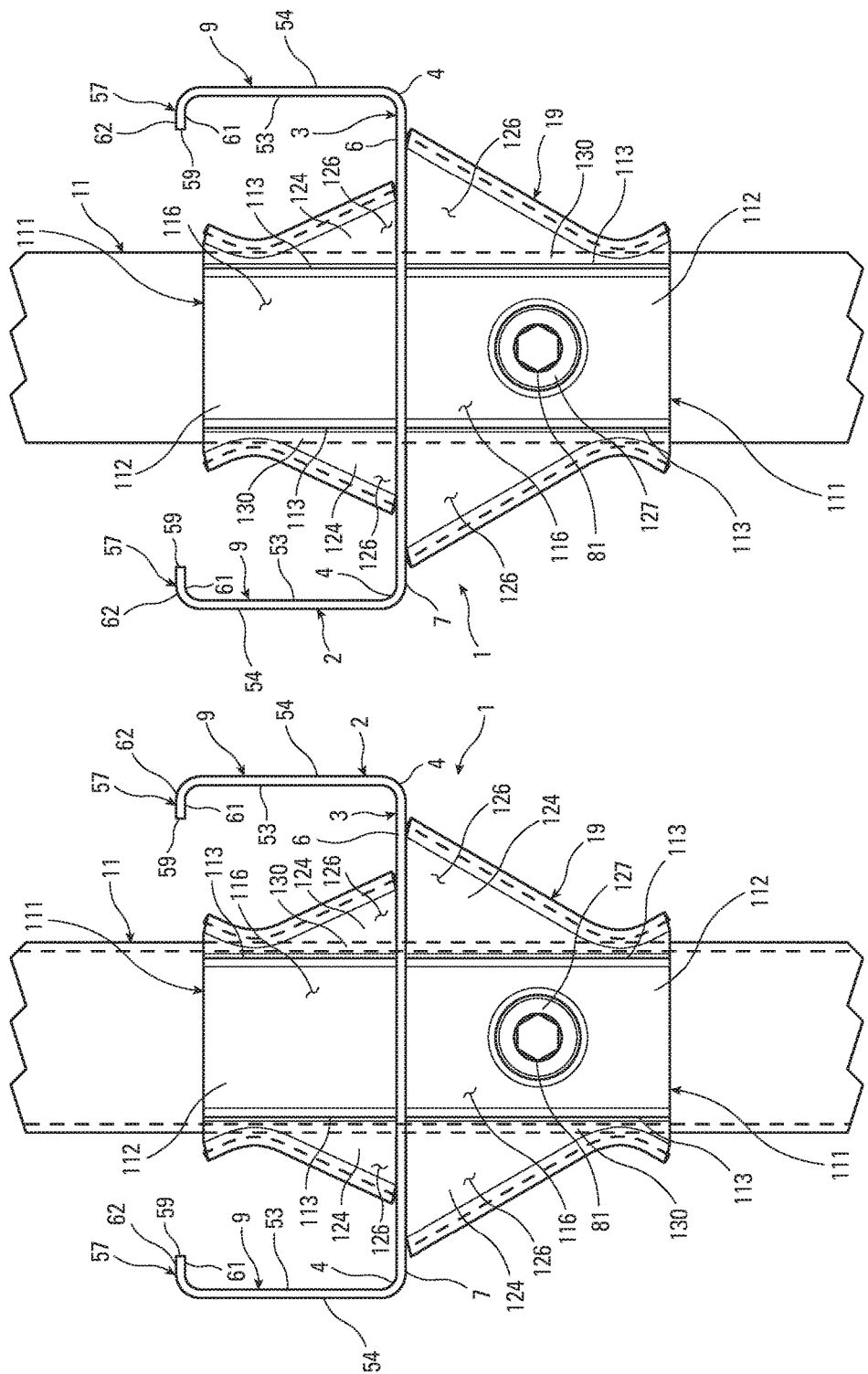

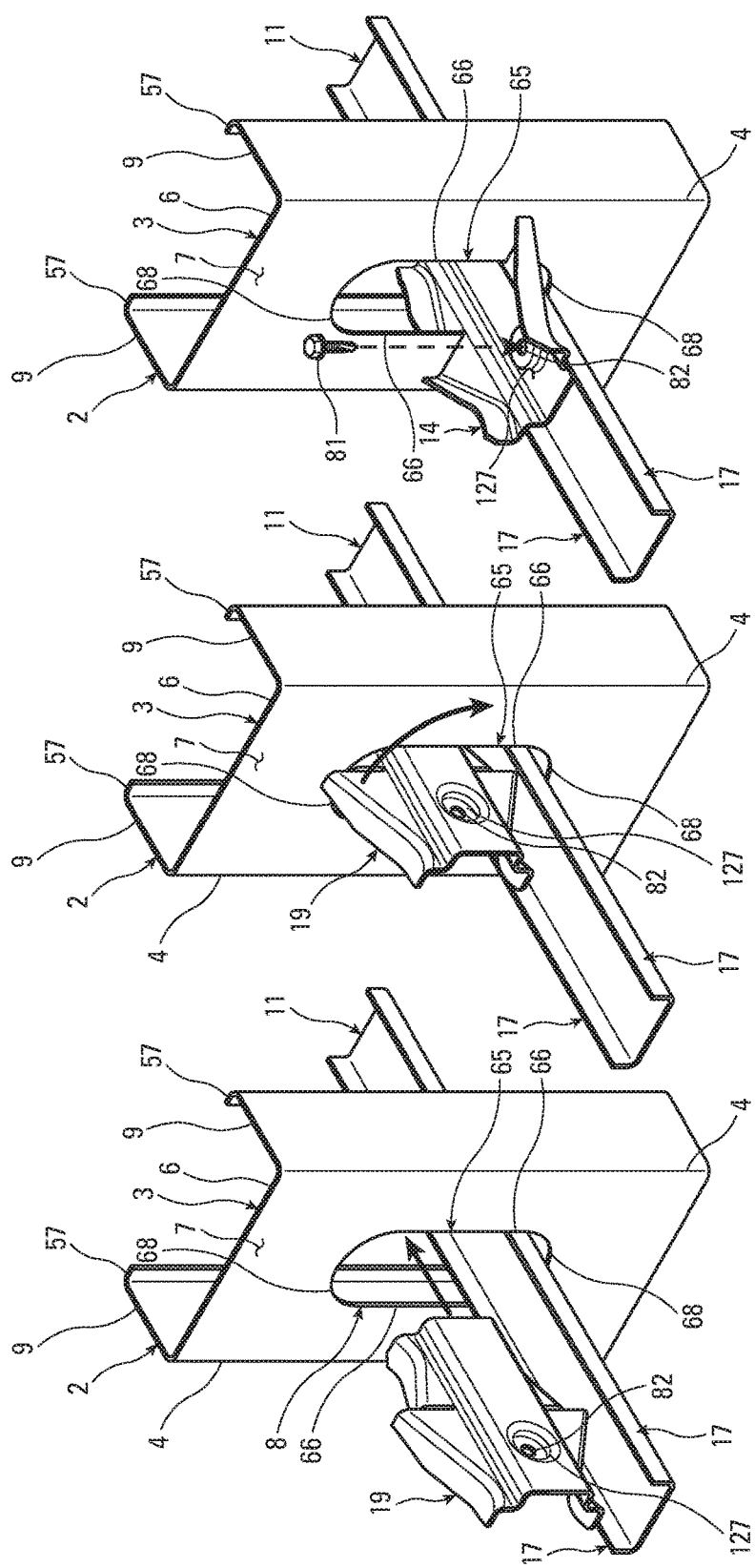

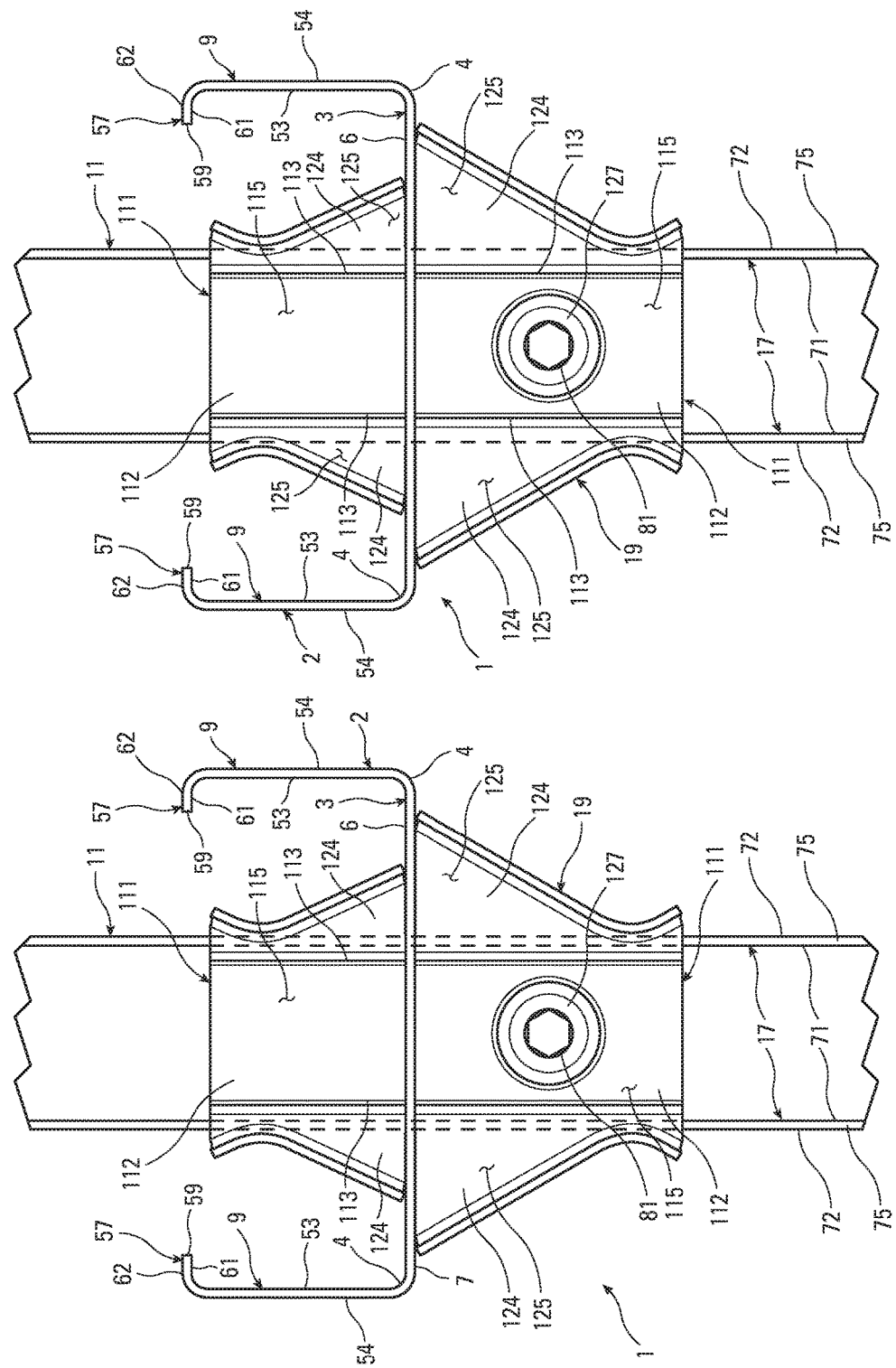

INVERTED BRIDGING CONNECTOR

BACKGROUND OF THE INVENTION

The present invention relates to steel stud building wall systems and especially to apparatuses for stabilizing steed studs to prevent lateral movement and torsion in such systems.

Many industrial, and a growing number of residential, buildings are constructed with steel stud wall framing for a variety of reasons. Steel framing is fireproof, does not warp, cannot be infested, and does not rot. When a wall is built with any kind of stud, wood or steel, it is generally desirable to fix sequential studs relative to each other and each against lateral movement and torsion. In wood-stud walls, a short piece of wood blocking is typically nailed to adjacent stud pairs to stabilize them. In steel-stud walls, an elongated steel bridging member is typically inserted horizontally through pre-punched openings in a series of vertical studs to keep them aligned. Steel studs have excellent columnar strength when they are straight, but a significant portion of that strength is lost if the studs are twisted. Because steel studs are particularly vulnerable to torsion, the bridging member, which is typically channel-shaped, having a horizontal web and two vertical side flanges, is made to closely fit the openings in the vertical studs in order to maximize torque resistance. In additional to mechanical torque, metal studs can twist or bend in response to the heat of a fire when the drywall sheathing, which acts as a firebreak, is destroyed. When metal studs twist or bend, they lose their weight-bearing capacity, multiplying the damage caused directly by fire.

While channel-shaped bridging members closely received in the openings can help restrain the studs from twisting, some twisting can still occur and the studs can still shift or bend parallel to the wall. A variety of sheet metal brackets, beginning with a simple right angle, have been designed to prevent this shifting or bending. The prior art brackets are all relatively labor intensive to install and their connections are all relatively weak. Fore example, with the simple right angle bracket, the installer places the horizontal leg of the bracket on the bridging member and the vertical leg of the bracket against the web of the wall stud. Screws are inserted through both legs to attach the bracket to the bridging member and the stud. The bracket relies on the screw connections to function, and the installer must ensure that the bracket is placed correctly. Later prior art brackets have improved on this basic connection.

The prior art also includes short bridging members that, like the wood blocking members mentioned above, span only adjacent studs and have ends tailored for fastening the wall studs, but these bridging members are relatively expensive because they use additional material to form the ends, they require a large number of fasteners, and they are necessarily of fixed length, which makes them useless if the spacing between any two studs has to be varied from the norm.

The prior art also includes elongated bridging members with a series of slots that are designed for mating with the opening in the wall stud webs, but these make relatively weak connections and also have the disadvantage that they cannot accommodate any variation in the spacing between studs.

It is an object of the present invention to provide a bracket that uses less material than prior art brackets, installs faster and more easily using fewer fasteners, and forms a connection that is stronger, resisting both lateral and torsional loads better than the prior art. It is a particular object of the present invention to provide a bracket that can be installed both outside and within the channel shape of the typical bridging member. The ability to install within the channel shape is especially advantageous because bridging members are frequently installed upside down, as a u-channel instead of the more correct n-channel.

SUMMARY OF THE INVENTION

The present invention provides a connector for firmly connecting and stabilizing a building wall steel stud in concert with a bridging member. The bridging member passes through an opening in each of several studs in a section of a wall. The bridging member is designed to keep the studs in alignment along the length of the wall when it is installed through the studs.

The present invention provides a connector with edges that interlock with the web of a wall stud to provide exceptional torsional rigidity. The edges are braced by the body parts of the connector, allowing them to resist substantially higher loads than flanges adjacent to the web of the wall stud.

The present invention provides a connector with edges or similarly narrow lines that interface with the sides of the bridging members that connect wall studs, also providing exceptional torsional rigidity. These narrow interfaces are braced by flanges that intersect with the sides of the bridging members instead of being positioned alongside and parallel to the sides of the bridging members.

The interfaces with the sides of the bridging members are further reinforced by bracing the opposite ends of the flanges against the web of the wall stud, so that the diagonal flanges are trapped between the sides of the bridging members and the web of the wall stud.

The exceptional strength of the interlocking connections between the bridging connector, the bridging member and the wall stud allow the bridging connector to be firmly connected with a single fastener that attaches the body of the bridging connector to the bridging member.

For added strength, additional fasteners can be used to attach the bridging connector to the wall stud.

The present connector is shaped to conform to the inner surfaces of the bridging member, but can be attached either within or outside the channel shape of the bridging member.

The present connector is mechanically interlocked with the boundary flanges of the bridging member and is restrained between the boundary flanges of the bridging member and the web of the stud.

The present connector can interface with the planar boundary flanges of the typically bridging member, providing an improved interlock between the two.

The present connector can interface with all three internal surfaces of the typical bridging member, providing a further improved interlock between the two.

The present connector provides a central portion with a channel shape similar to that of the typical bridging member, providing a further improved interlock between the two.

The present connector provides a central portion with a right-angled channel shape, providing a further improved interlock between the two.

The present connector can extend laterally beyond the bridging member to provide improved connection between the bridging member and the web of the stud.

The present connector provides side flanges that brace the boundary flanges of the bridging member against the web of the stud.

The present connector provides a fastener embossment that stiffens the connector around the fastener opening and can provide contact with the bridging member when the connector is installed outside the bridging member channel.

The present connector can fastened with a single fastener, easing and speeding installation.

The present connector provides slots that with edges that face and can interface with the web of the stud on either side of the stud web opening.

The present connector provides a connection that reinforces the stud against torsional rotation on a vertical axis. The same connection reinforces the bridging member against rotation on a horizontal axis.

BRIEF DESCRIPTION OF THE DRAWINGS

FIG. 2 is an upper front right perspective view of a bridging connector formed according to the present invention before it is inserted in the elongated opening in the web of a typical cold-formed steel stud above a typical cold-formed steel bridging member.

FIG. 3 is an upper front right perspective view of a bridging connector formed according to the present invention as it is being inserted in the elongated opening in the web of a typical cold-formed steel stud above a typical cold-formed steel bridging member.

FIG. 4 is an upper front right perspective view of a bridging connector formed according to the present invention interfacing with the sides of the elongated opening in the web of a typical cold-formed steel stud and resting on a typical cold-formed steel bridging member before being attached to the bridging member with a separate fastener.

FIG. 5 is a top plan view of a connection made between a typical cold-formed steel wall stud, a typical cold-formed steel bridging member, and the preferred form of the bridging connector of the present invention, showing the portion of the bridging member below the bridging connector, the inner surfaces of the boundary flanges of the bridging connector, and the inner surfaces of the side flanges of the bridging connector in phantom line.

FIG. 6 is a top plan view of connection made between a typical cold-formed steel wall stud, a typical cold-formed steel bridging member, and the preferred form of the bridging connector of the present invention.

FIG. 8 is an upper front right perspective view of a bridging connector formed according to the present invention before it is inserted in the elongated opening in the web of a typical cold-formed steel stud above an inverted cold-formed steel bridging member.

FIG. 9 is an upper front right perspective view of a bridging connector formed according to the present invention as it is being inserted in the elongated opening in the web of a typical cold-formed steel stud above an inverted cold-formed steel bridging member.

FIG. 10 is an upper front right perspective view of a bridging connector formed according to the present invention interfacing with the sides of the elongated opening in the web of a typical cold-formed steel stud and resting on an inverted cold-formed steel bridging member before being attached to the bridging member with a separate fastener.

FIG. 11 is a top plan view of a connection made between a typical cold-formed steel wall stud, an inverted cold-formed steel bridging member, and the preferred form of the bridging connector of the present invention, showing the portion of the bridging member below the bridging connector, the inner surfaces of the boundary flanges of the bridging connector, and the inner surfaces of the side flanges of the bridging connector in phantom line.

FIG. 12 is a top plan view of connection made between a typical cold-formed steel wall stud, an inverted cold-formed steel bridging member, and the preferred form of the bridging connector of the present invention.

DETAILED DESCRIPTION OF THE INVENTION

Figure 1:
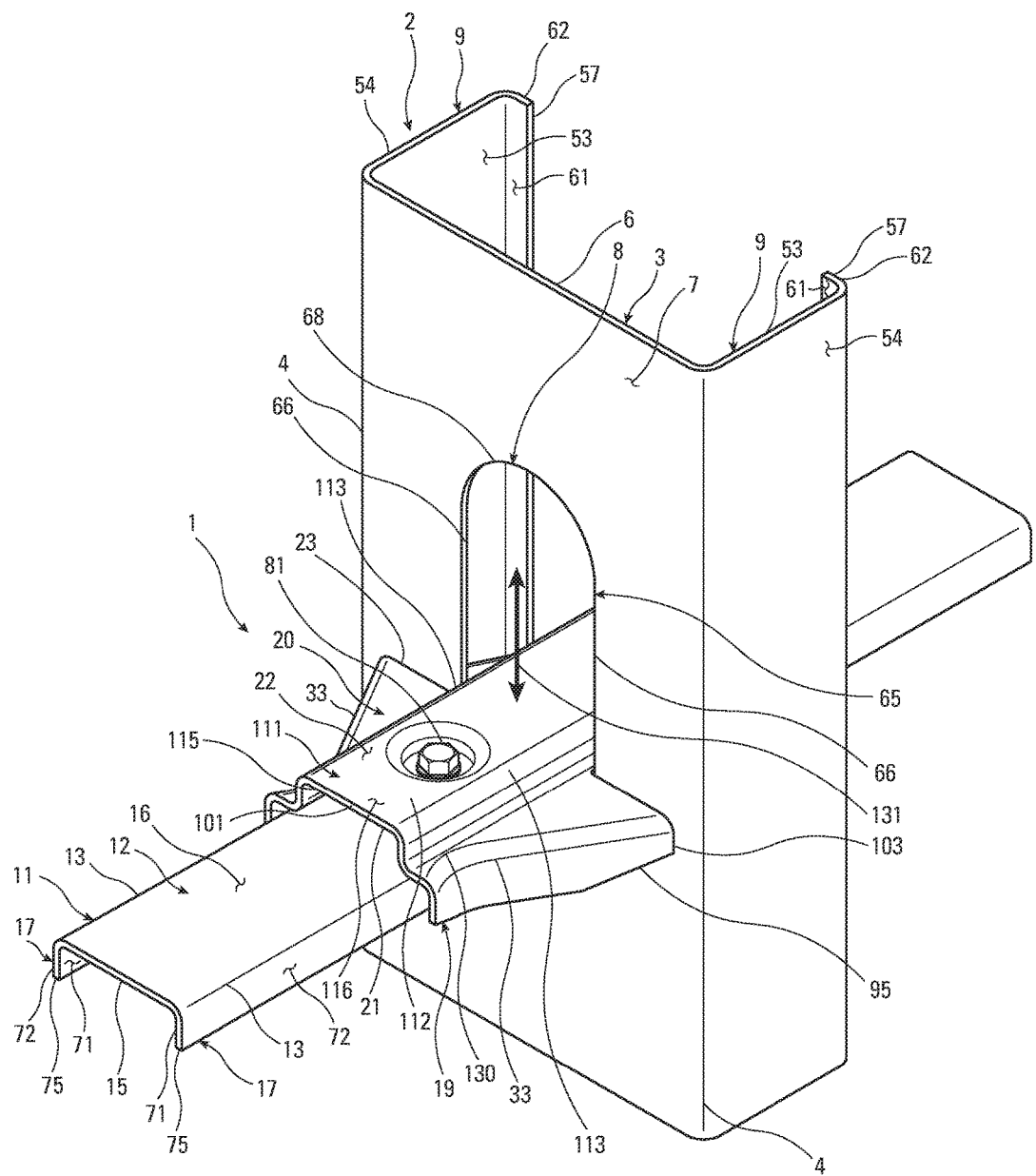
FIG. 1 is an upper front right perspective view of a connection made between a typical cold-formed steel wall stud, a typical cold-formed steel bridging member, and a bridging connector formed according to the present invention.

As shown in FIGS. 1, 4-7 and 10-12, the present invention is a building connector 1 that comprises a substantially vertical wall stud 2, a substantially horizontal bridging member 11, and a bridging connector 19. The structural members are typically made from cold-formed sheet steel, and the bridging connector 19 is preferably made from cold-formed steel, but any or all can be made from other sufficiently strong materials, formed by any appropriate method of manufacture.

As shown in FIGS. 1-4 and 7-10, the substantially vertical wall stud 2 preferably has a central web 3 with an opening 8, a first side flange 9 integrally attached to the central web 3, and a second side flange 9 integrally attached to the central web 3. The central web 3 is typically bounded by four sides 4, and the central web 3 has an inner surface 6 and an outer surface 7. The opening 8 in the central web is typically elongated vertically, with an edge 65 that has two elongated vertical portions 66 to either side and two concave portions 68 joining the vertical portions 66. The side flanges 9 have inner surfaces 53 and outer surfaces 54. In addition, the wall stud 2 typically has first and second stiffening flanges 57 attached to the first and second side flanges 9, respectively. The stiffening flanges 57 have inner edges 59 that face each other, inner surfaces 61 and outer surfaces 62.

As shown in FIGS. 1-4 and 7-10, preferably the substantially horizontal bridging member 11 has an at least partially planar middle web 12, an at least partially planar first boundary flange 17, and an at least partially planar second boundary flange 17. The at least partially planar middle web 12 preferably has a first boundary 13 and a second boundary 13, an internal surface 15 and an external surface 16. Preferably, the at least partially planar first boundary flange 17 is angularly joined to and extends from the middle web 12 at the first boundary 13. The first boundary flange 17 preferably has an internal surface 71 and an external surface 72. Preferably, the at least partially planar second boundary flange 17 is angularly joined to and extends from the middle web 12 at the second boundary 13. The second boundary flange 17 preferably has an internal surface 71 facing toward the internal surface 71 of the first boundary flange 17 and an external surface 72 facing away from the external surface 72 of the first boundary flange 17. Preferably, the first and second boundary flanges 17 of the bridging member 11 have first and second outer edges 75, respectively, that are mutually parallel.

As shown in FIGS. 1, 5-7, 11 and 12, the bridging connector 19 preferably contacts the central web 3 of the wall stud 2 and is fastened to the bridging member 11. Preferably, the bridging connector 19 has a first body part 20, a first interior surface 21 and a first exterior surface 22. The first body part 20 preferably has a first inner edge 23 and a first outer edge 101. Preferably, a rigid central portion 11 of the first body part 20 is dimensioned to conform to substantially planar portions of the internal surface 71 of the first boundary flange 17 and the internal surface 71 of the second boundary flange 17 of the horizontal bridging member 11. Thus, the first body part 20 preferably makes at least two points of contact with the internal surface 71 of one of the first and second boundary flanges 17 and at least one point contact with the internal surface 71 of the other of the first and second boundary flanges 17.

As shown in FIGS. 14-19, preferably the first exterior surface 22 is opposite the first interior surface 21. One of the first interior surface 21 and the first exterior surface 22 preferably faces the bridging member 11. Preferably, the first body part 20 has a first side boundary 33 and a second side boundary 33. The central portion 111 of the bridging connector 19 is preferably bounded by a first straight borderline 130 and a second straight borderline 130. Preferably, the first and second outer edges 75 of the first and second boundary flanges 17, respectively, of the bridging member 11.

As shown in FIGS. 1, 5-7, 11 and 12, the central portion 111 of the first body part 20 is preferably dimensioned so that the central portion 111 of the first body part 20 can interface with the internal surfaces 71 of the first and second boundary flanges 17 of the bridging member 11 such that the bridging connector 19 is restrained from rotational movement on a vertical axis 131 relative the bridging member 11 by the mechanical interlock between central portion 111 of the bridging connector 19 and the first and second boundary flanges 17 of the bridging member 11.

As shown in FIGS. 1, 5-7, 11 and 12, preferably a first substantially planar part 117 of the central portion 111 of the first body part 20 is dimensioned to conform to a substantially planar portion of the internal surface 71 of the first boundary flange 17 of the horizontal bridging member 11. A second substantially planar part 117 of the central portion 111 of the first body part 20 is preferably dimensioned to conform to a substantially planar portion of the internal surface 71 of the second boundary flange 17 of the horizontal bridging member 11.

As shown in FIGS. 1, 5-7, 11 and 12, the central portion 111 of the first body part 20 is preferably dimensioned to conform to adjacent portions of the internal surfaces 15 of the middle web 12, the internal surface 71 of the first boundary flange 17 and the internal surface 71 of the second boundary flange 17 of the horizontal bridging member 11.

As shown in FIGS. 14-19, preferably the central portion 111 of the first body part 20 has a central web portion 112, a first border extension 117, and a second border extension 117. The central web portion 112 preferably has a first border 113 and a second border 113, an inside surface 115 and an outside surface 116. Preferably, the first border extension 117 is joined to the first border 113. The first border extension 117 preferably has an inside surface 118 and an outside surface 119. The second border extension 117 is preferably joined to the second border 113. Preferably, the second border extension 120 has an inside surface 118 and an outside surface 119. The central web portion 112 of the first body part 20 preferably is angularly related to the first border extension 117 and the second border extension 120.

As shown in FIGS. 14-19, preferably the angle between the inside surface 115 of the central web portion 112 and the inside surface 118 of the first border extension 117 is orthogonal. The angle between the inside surface 115 of the central web portion 112 and the inside surface 118 of the second border extension 120 preferably is orthogonal as well.

As shown in FIGS. 14-19, preferably the first border extension 117 extends from the first border 113 to a first juncture 123. The second border extension 117 preferably extends from the second border 113 to a second juncture 123. Preferably, the first body part 20 includes a first lateral extension 124 that is joined to the first juncture 123 and extends past the first boundary flange 17 of the bridging member 11 to the first side boundary 33 of the first body part 20 of the bridging connector 19. The first body part 20 preferably includes a second lateral extension 124 that is joined to the second juncture 124 and extends past the second boundary flange 17 of the bridging member 11 to the second side boundary 33 of the first body part 20 of the bridging connector 19. Preferably, the first border extension 117 is angularly related to the first lateral extension 124. The second border extension 117 preferably is angularly related to the second lateral extension 124.

As shown in FIGS. 14-19, preferably the first lateral extension 124 has a first interior surface 125 and a first exterior surface 126. The second lateral extension 126 preferably has a second interior surface 125 and a second exterior surface 126. Preferably, the angle between the outside surface 119 of the first border extension 117 and the exterior surface 126 of the first lateral extension 124 is orthogonal. The angle between the outside surface 119 of the second border extension 117 and the exterior surface 126 of the second lateral extension 124 also is preferably orthogonal.

As shown in FIGS. 1, 5-7, 11 and 12, preferably, a first side flange 35 is attached to the first side boundary 33 and a second side flange 35 is attached to the second side boundary 33. The first side flange 35 preferably has an inner surface 37 and an outer surface 38 opposite the inner surface 37. Preferably, the second side flange 35 has an inner surface 37 and an outer surface 38 opposite the inner surface 37. The first side flange 35 of the bridging connector 2 preferably interfaces with the first boundary flange 17 of the bridging member 11. Preferably, the second side flange 35 of the bridging connector 2 interfaces with the second boundary flange 17 of the bridging member 11. The first side flange 35 of the bridging connector 2 and the first boundary flange 17 of the bridging member 11 preferably are at least partially nonparallel. Preferably, the second side flange 35 of the bridging connector 2 and the second boundary flange 17 of the bridging member 11 are at least partially nonparallel. The sides flanges 35 preferably have outer end edges 91, lower edges 95, and inner end edges 103.

Figure 7:
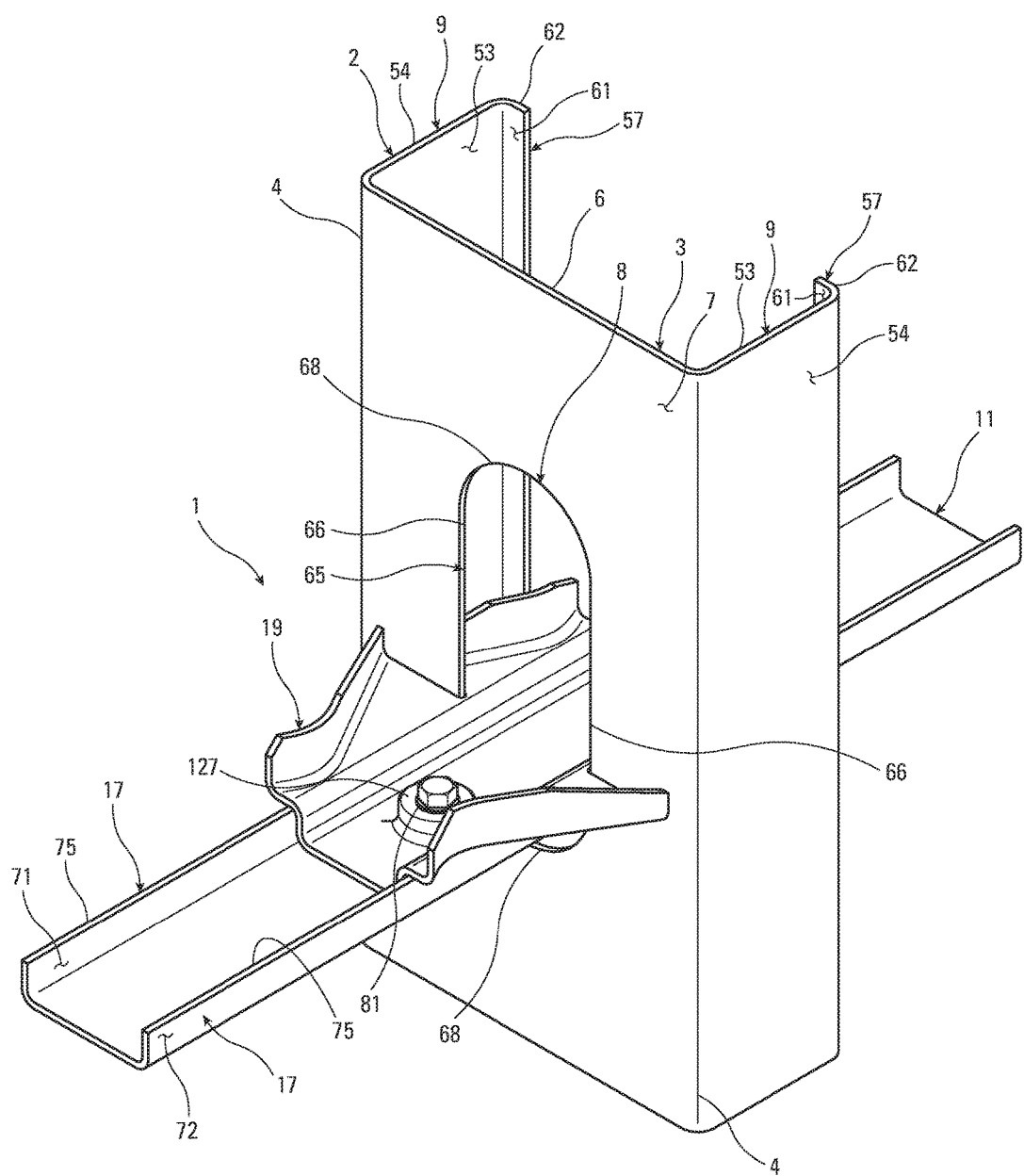
FIG. 7 is an upper front right perspective view of a connection made between a typical cold-formed steel wall stud, an inverted cold-formed steel stud, and a inverted bridging connector formed according to the present invention.
Figure 13:
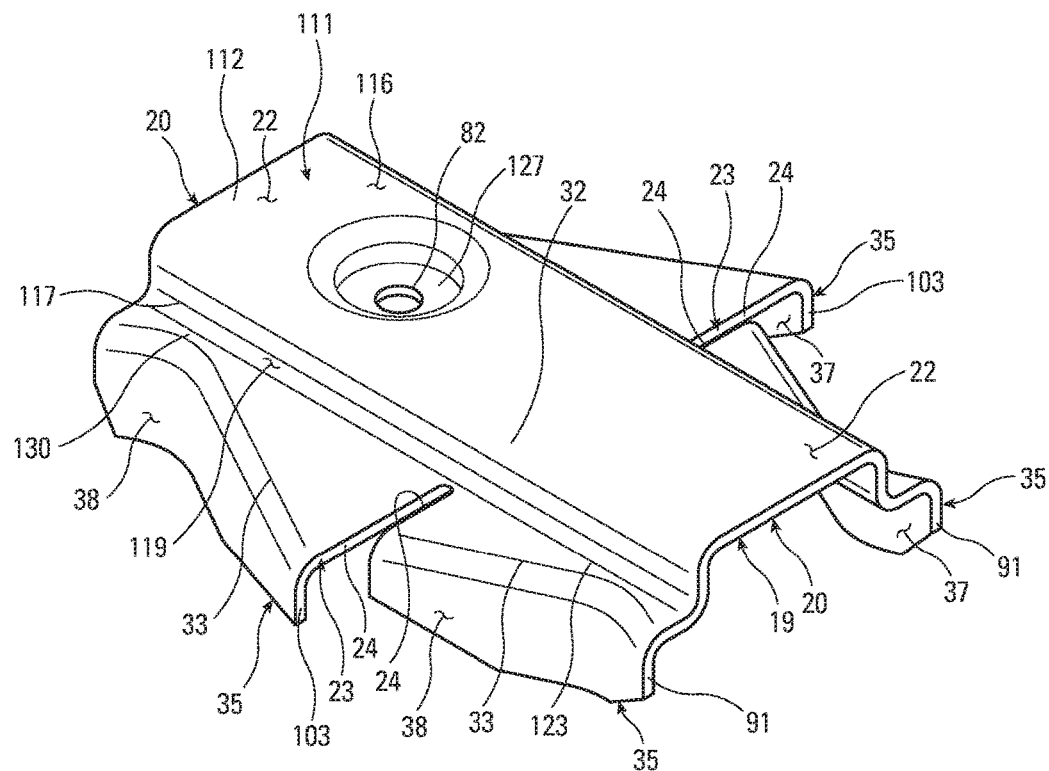
FIG. 13 is an upper rear left perspective view of the preferred form of the bridging connector of the present invention.
Figure 14:
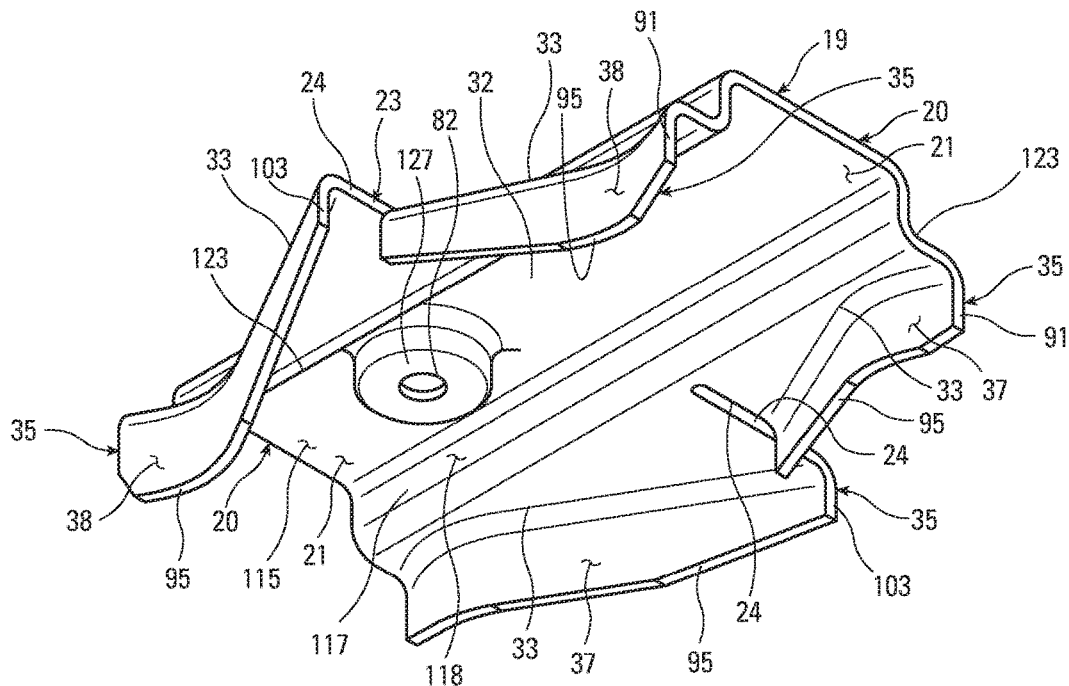
FIG. 14 is a lower rear left perspective view of the preferred form of the bridging connector of the present invention.
Figure 15:
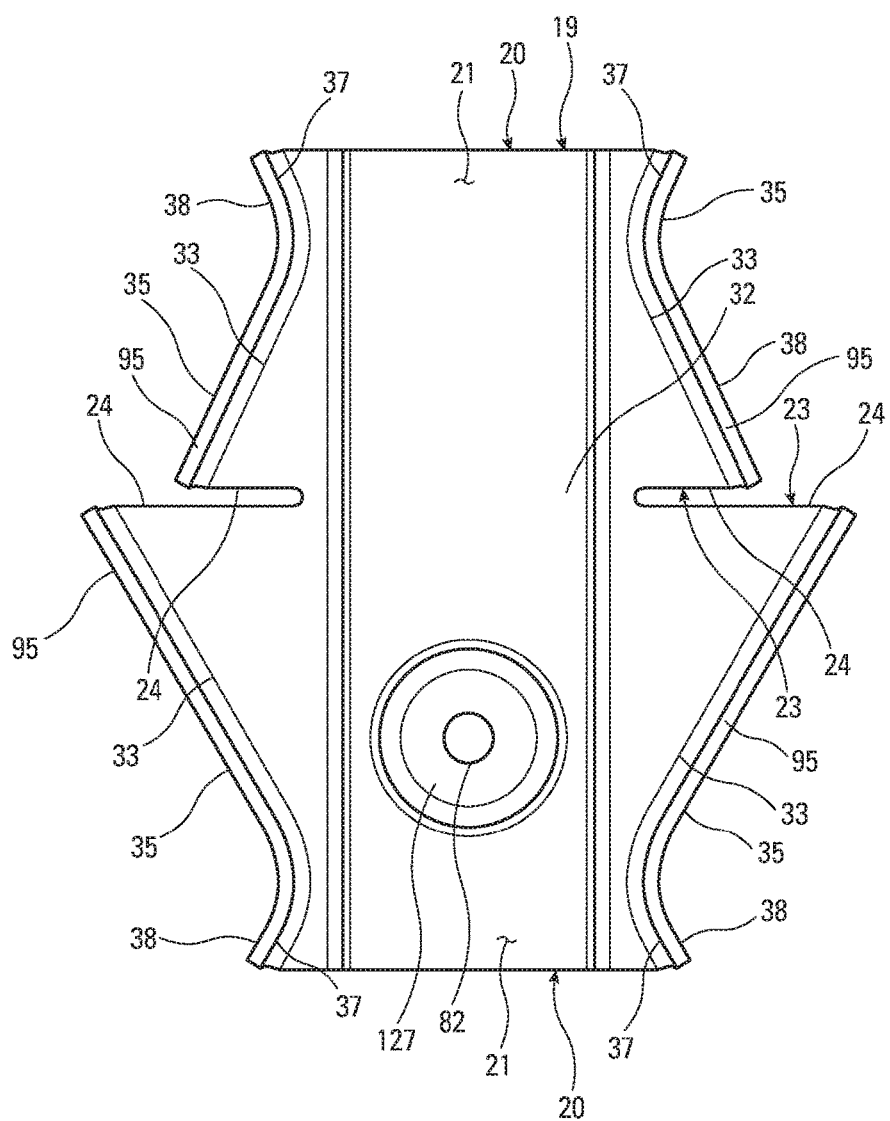
FIG. 15 is a bottom plan view of the preferred form of the bridging connector of the present invention.
Figure 16:
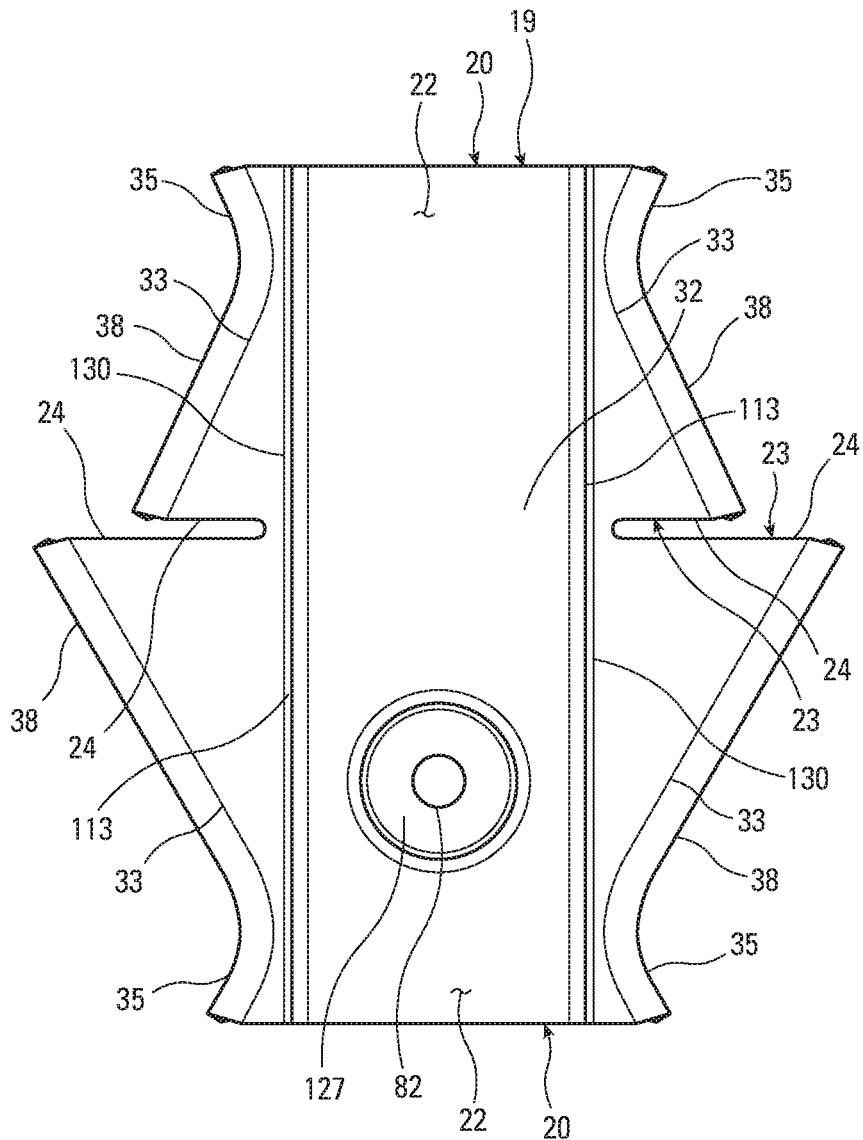
FIG. 16 is a top plan view of the preferred form of the bridging connector of the present invention.
Figure 17:
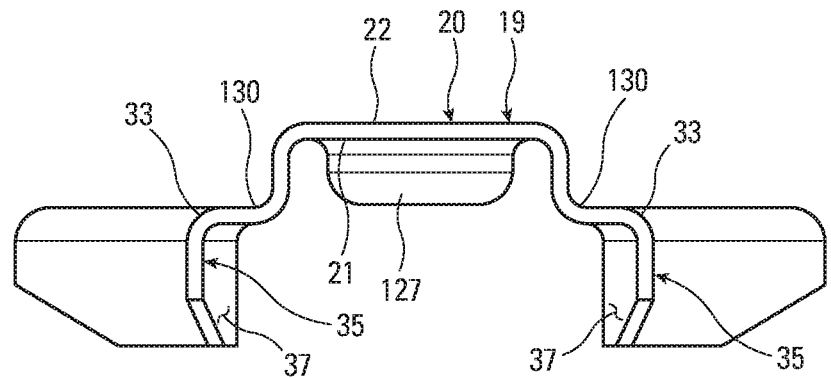
FIG. 17 is a rear elevation view of the preferred form of the bridging connector of the present invention.
Figure 18:
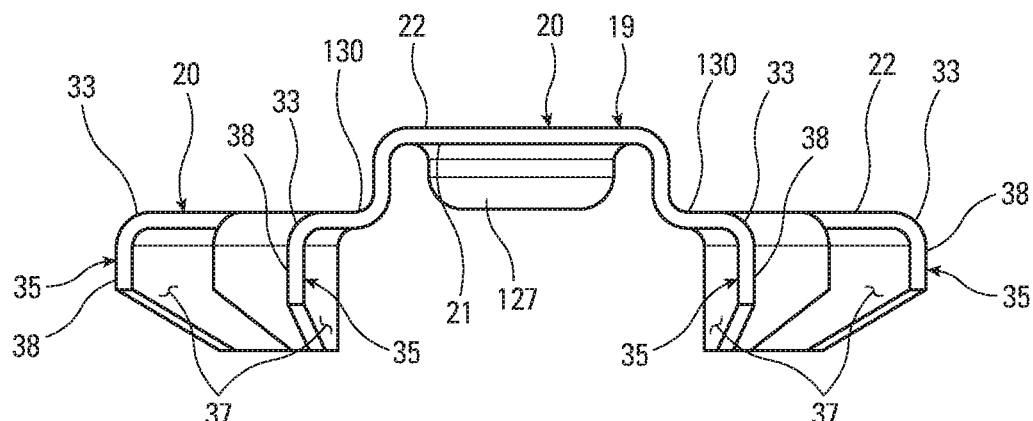
FIG. 18 is a front elevation view of the preferred form of the bridging connector of the present invention.
Figure 19:
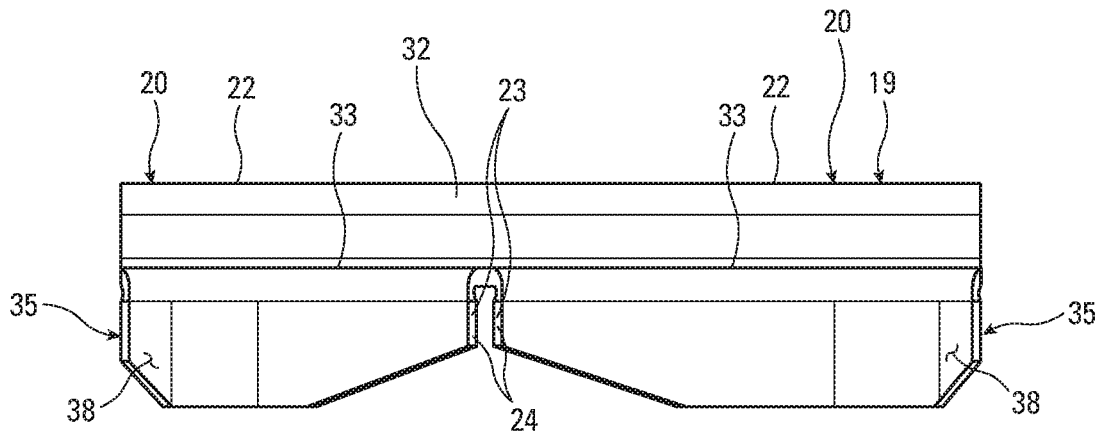
FIG. 19 is a left side elevation view of the preferred form of the bridging connector of the present invention.

As shown in FIGS. 7, 11 and 12, the outside surface 116 of the central web portion 112 preferably is adjacent the internal surface 15 of the middle web 12 of the bridging member 11. Preferably, the outside surface 119 of the first border extension 117 is adjacent the internal surface 171 of the first boundary flange 17 of the bridging member 11. The outside surface 119 of the second border extension 120 preferably is adjacent the internal surface 181 of the second boundary flange 17 of the bridging member 11.

As shown in FIGS. 7, 11 and 12, preferably the central web portion 112 of the bridging connector 19 includes a first fastening embossment 127 centered on a first fastener opening 82. The first fastener embossment 127 preferably does not contact the middle web 12 of the bridging member 11. The fastener embossment 127 is preferably the same height as the boundary flanges 17 of the bridging member 11, and it is preferably round, but its height and circumference can take other dimensions and forms.

As shown in FIGS. 1, 5-7, 11 and 12, preferably, only a single fastener 81 fastens the bridging connector 19 to the bridging member 11, and the single fastener 81 is inserted through the fastener opening 82 in the first fastening embossment 127. Additional fasteners 81 can be used if additional strength is needed. There can also be additional fastener embossments 127. When the bridging connector 19 is installed outside the bridging member 11 channel, there is a force couple between the fastener 81 and the geometric features of the bridging connector 19 that abut the central web 3 of the wall stud 2. The same force couple exists when the bridging connector 19 is installed in the bridging member 11 channel, but the preferred form of the bridging connector 19 has a geometry that itself resists rotation around a vertical axis 131 so that the fastener 81 prevents the bridging connector 19 from escaping the bridging member 11 channel. In the preferred embodiment, the fastener 81 is a sheet metal screw 81, other fasteners 81 can be used.

Alternatively, as shown in FIGS. 1, 5 and 6, the inside surface 115 of the central web portion 112 preferably faces the external surface 16 of the middle web 12 of the bridging member 11. Preferably, the first juncture 123 between the first border extension 117 and the first lateral extension 124 of the bridging connector 19 is adjacent the first boundary 13 of the middle web 12 of the bridging member 11. The second juncture 123 between the second border extension 117 and the second lateral extension 124 of the bridging connector 19 preferably is adjacent the second boundary 13 of the middle web 12 of the bridging member 11.

As shown in FIGS. 1, 5 and 6, preferably the central web portion 112 of the bridging connector 19 includes a first fastening embossment 127 that contacts the external surface 16 of the middle web 12 of the bridging member 11.

As shown in FIGS. 1, 5 and 6, only a single fastener 81 preferably fastens the bridging connector 19 to the bridging member 11, and the single fastener 81 is inserted through the fastener opening 82 in the first fastening embossment 127, where the fastening embossment 127 of the bridging connector 19 contacts the external surface 16 of the middle web 12 of the bridging member.

As shown in FIGS. 1, 5-7, 11 and 12, preferably the first inner edge 23 has a first web interface portion 24 and a second web interface portion 24 The bridging connector 19 preferably has a second body part 20 and a neck 32 joining the first body part 20 to the second body part 20. Preferably, the second body part 20 has a second interior surface 21, a second exterior surface 22 opposite the second interior surface 11, a second inner edge 29 with a third web interface portion 24 and a fourth web interface portion 24. One of the second interior surface 21 and the second exterior surface 22 preferably faces the bridging member 11. Preferably, the neck 32 joins the first body part 20 to the second body part 20 between the first web interface portion 24 and the second web interface portion 24 of the first inner edge 23 and between the third web interface portion 24 and the fourth web interface portion 24 of the second inner edge 29. The neck 32 preferably passes through the opening 8 in the central web 3 of the wall stud 2. Preferably the first web interface portion 24 and a second web interface portion 24 of the first inner edge 23 interface with the central web 3 of the wall stud 2. The third web interface portion 24 and the fourth web interface portion 24 of the second inner edge 29 preferably interface with the central web 3 of the wall stud 2.

As shown in FIGS. 7, 11 and 12, preferably a rigid central portion 111 of the second body part 20 is dimensioned to conform to adjacent portions of at least two of the internal surfaces 15, 71 of the middle web 12, the first boundary flange 17 and the second boundary flange 17 of the horizontal bridging member 11. The second body part 20 preferably makes at least two point of contact with the internal surface 71 of one of the first and second boundary flanges 17 and at least one point of contact with the internal surface 71 of the other of the first and second boundary flanges 17.

As shown in FIGS. 7, 11 and 12, referably the central portion 111 of the second body part 20 is dimensioned so that the central portion 111 of the second body part 20 can interface with the internal surfaces 71 of the first and second boundary flanges 17 of the bridging member 11 such that the bridging connector 19 is restrained from rotational movement on a vertical axis relative the bridging member 11 by the mechanical interlock between central portion 111 of the bridging connector 19 and the first and second boundary flanges 17 of the bridging member 11.

As shown in FIGS. 7, 11 and 12, a first substantially planar part 117 of the central portion 111 of the second body part 20 is preferably dimensioned to conform to a substantially planar portion of the internal surface 71 of the first boundary flange 17 of the horizontal bridging member 11. Preferably, a second substantially planar part 117 of the central portion 111 of the second body part 20 is dimensioned to conform to a substantially planar portion of the internal surface 71 of the second boundary flange 17 of the horizontal bridging member 11.

As shown in FIGS. 7, 11 and 12, the central portion 111 of the second body part 20 is preferably dimensioned to conform to adjacent portions of the internal surfaces 15 of the middle web 12, the internal surface 71 of the first boundary flange 17 and the internal surface 71 of the second boundary flange 17 of the horizontal bridging member 11.

Preferably, the central portion 111 of the second body part 20 has a central web portion 112, a first border extension 117, and a second border extension 117 joined to the second border 113. The central web portion 112 preferably has a first border 113 and a second border 113, an inside surface 115 and an outside surface 116. Preferably, the first border extension 117 is joined to the first border 113, the first border extension 117 having an inside surface 118 and an outside surface 119. The second border extension 117 is preferably joined to the second border 113, the second border extension 120 having an inside surface 118 and an outside surface 119. Preferably, the central web portion 112 of the second body part 20 is angularly related to the first border extension 117 and the second border extension 120.

The angle between the inside surface 115 of the central web portion 112 of the second body part 20 and the inside surface 118 of the first border extension 117 of the second body part 20 is preferably orthogonal. Preferably, the angle between the inside surface 115 of the central web portion 112 of the second body part 20 and the inside surface 118 of the second border extension 120 of the second body part 20 is also orthogonal.

The first border extension 117 of the second body part 20 preferably extends from the first border 113 to a first juncture 123. Preferably, the second border extension 117 of the second body part 20 extends from the second border 113 to a second juncture 123. The second body part 20 preferably includes a first lateral extension 124 that is joined to the first juncture 123 and extends past the first boundary flange 17 of the bridging member 11 to the first side boundary 33 of the first body part 20 of the bridging connector 19. Preferably, the second body part 20 includes a second lateral extension 124 that is joined to the second juncture 124 and extends past the second boundary flange 17 of the bridging member 11 to the second side boundary 33 of the first body part 20 of the bridging connector 19. The first border extension 117 of the second body part 20 preferably is angularly related to the first lateral extension 124 of the second body part 20. Preferably, the second border extension 117 of the second body part 20 is angularly related to the second lateral extension 124 of the second body part 20.

The first lateral extension 124 of the second body part 20 preferably has a first interior surface 125 and a first exterior surface 126. Preferably, the second lateral extension 126 of the second body part 20 has a second interior surface 125 and a second exterior surface 126. The angle between the outside surface 119 of the first border extension 117 of the second body part 20 and the exterior surface 126 of the first lateral extension 124 of the second body part 20 is preferably orthogonal. Preferably, the angle between the outside surface 119 of the second border extension 117 of the second body part 20 and the exterior surface 126 of the second lateral extension 124 of the second body part 20 is also orthogonal.

As shown in FIGS. 1 and 4, a first side flange 35 is preferably attached to the first side boundary 33 of the second body part 20 and a second side flange 35 is attached to the second side boundary 33 of the second body part 20. Preferably, the first side flange 35 of the second body part 20 has an inner surface 37 and an outer surface 38 opposite the inner surface 37. The second side flange 35 of the second body part 20 preferably has an inner surface 37 and an outer surface 38 opposite the inner surface 37. Preferably, the first side flange 35 of the second body part 20 of the bridging connector 2 interfaces with the first boundary flange 17 of the bridging member 11. The second side flange 35 of the second body part 20 of the bridging connector 2 preferably interfaces with the second boundary flange 17 of the bridging member 11. Preferably, the first side flange 35 of the second body part 20 of the bridging connector 2 and the first boundary flange 17 of the bridging member 11 are at least partially nonparallel. The second side flange 35 of the second body part 20 of the bridging connector 2 and the second boundary flange 17 of the bridging member 11 preferably are at least partially nonparallel as well.

As shown in FIGS. 7, 11 and 12, preferably the outside surface 116 of the central web portion 112 of the second body part 20 is adjacent the internal surface 15 of the middle web 12 of the bridging member 11. The outside surface 119 of the first border extension 117 of the second body part 20 preferably is adjacent the internal surface 171 of the first boundary flange 17 of the bridging member 11. Preferably, the outside surface 119 of the second border extension 120 of the second body part 20 is adjacent the internal surface 181 of the second boundary flange 17 of the bridging member 11.

As shown in FIGS. 7, 11 and 12, the central web portion 112 of the first body part 20 of the bridging connector 19 preferably includes a first fastening embossment 127 centered on a first fastener opening 82. Preferably, the first fastener opening 82 does not contact the middle web 12 of the bridging member 11.

As shown in FIGS. 7, 11 and 12, only a single fastener 81 preferably fastens the bridging connector 19 to the bridging member 11, and the single fastener 81 is inserted through the fastener opening 82 in the first fastening embossment 127.

Alternatively, as shown in FIGS. 1, 5 and 6, preferably the inside surface 115 of the central web portion 112 of the second body part 20 faces the external surface 16 of the middle web 12 of the bridging member 11. The first juncture 123 between the first border extension 117 of the second body part 20 and the first lateral extension 124 of the second body part 20 of the bridging connector 19 preferably is adjacent the first boundary 13 of the middle web 12 of the bridging member 11. Preferably, the second juncture 123 between the second border extension 117 of the second body part 20 and the second lateral extension 124 of the second body part 20 of the bridging connector 19 is adjacent the second boundary 13 of the middle web 12 of the bridging member 11.

As shown in FIGS. 1, 5 and 6, the central web portion 112 of the first body part 20 of the bridging connector 19 preferably includes a first fastening embossment 127 that contacts the external surface 16 of the middle web 12 of the bridging member 11.

As shown in FIGS. 1, 5 and 6, preferably only a single fastener 81 fastens the bridging connector 19 to the bridging member 11, and the single fastener 81 is inserted through the fastener opening 82 in the first fastening embossment 127. The fastening embossment 127 of the bridging connector 19 preferably contacts the external surface 16 of the middle web 12 of the bridging member.

We claim:
1. A building connection (1) comprising:
   a. a substantially vertical wall stud (2) having:
      i. a central web (3) having an opening (8);
      ii. a first side flange (9) integrally attached to the central web (3); and
      iii. a second side flange (9) integrally attached to the central web (3);
   b. a substantially horizontal bridging member (11) inserted through the opening (8) of the central web (3) comprising:
      i. an at least partially planar middle web (12) having a first boundary (13) and a second boundary (13), an internal surface (15) and an external surface (16);
      ii. an at least partially planar first boundary flange (17) angularly joined to and extending from the middle web (12) at the first boundary (13), the first boundary flange (17) having an internal surface (71) and an external surface (72);
      iii. an at least partially planar second boundary flange (17) angularly joined to and extending from the middle web (12) at the second boundary (13), the second boundary flange (17) having an internal surface (71) facing toward the internal surface (71) of the first boundary flange (17) and an external surface (72) facing away from the external surface (72) of the first boundary flange (17); and iv. wherein the first and second boundary flanges (17) of the bridging member (11) have first and second outer edges (75), respectively, that are mutually parallel;
c. a bridging connector (19) contacting the central web (3) of the wall stud (2) and fastened to the bridging member (11), the bridging connector (19) comprising:
 i. a first body part (20) having a first inner edge (23) and a first outer edge (101), wherein a rigid central portion (111) of the first body part (20) is dimensioned to conform to substantially planar portions of the internal surface (71) of the first boundary flange (17) and the internal surface (71) of the second boundary flange (17) of the horizontal bridging member (11), such that the first body part (20) makes at least two points of contact with the internal surface (71) of one of the first and second boundary flanges (17) and at least one point of contact with the internal surface (71) of the other of the first and second boundary flanges (17);
 ii. a first interior surface (21) and a first exterior surface (22) opposite the first interior surface (21), one of the first interior surface (21) and the first exterior surface (22) facing the bridging member (11);
d. wherein the central portion (111) of the first body part (20) includes:
 i. a central web portion (112) having a first border (113) and a second border (113), an inside surface (115) and an outside surface (116):
 ii. a first substantially planar border extension (117) joined to the first border (113), the first substantially planar border extension (117) having an inside surface (118) and an outside surface (119); and
 iii. a second substantially planar border extension (117) joined to the second border (113), the second substantially planar border extension (120) having an inside surface (118) and an outside surface (119); wherein the central web portion (112) of the first body part (20) is angularly related to the first substantially planar border extension (117) and the second substantially planar border extension (120), and the first substantially planar border extension (117) extends from the first border (113) to a first juncture (123); the second substantially planar border extension (117) extends from the second border (113) to a second juncture (123); the first body part (20) includes a first substantially planar lateral extension (124) that is joined to the first juncture (123) and extends past the first boundary flange (17) of the bridging member (11) to a first side boundary (33) of the first body part (20) of the bridging connector (19); the first body part (20) includes a second substantially planar lateral extension (124) that is joined to the second juncture (124) and extends past the second boundary flange (17) of the bridging member (11) to a second side boundary (33) of the first body part (20) of the bridging connector (19); the first substantially planar border extension (117) is angularly related to the first substantially planar lateral extension (124); and the second substantially planar border extension (117) is angularly related to the second substantially planar lateral extension (124).

2. The building connection (1) of claim 1 wherein the central portion (111) of the first body part (20) is dimensioned so that the central portion (111) of the first body part (20) can interface with the internal surfaces (71) of the first and second boundary flanges (17) of the bridging member (11) such that the bridging connector (19) is restrained from rotational movement on a vertical axis (131) relative the bridging member (11) by the mechanical interlock between central portion (111) of the bridging connector (19) and the first and second boundary flanges (17) of the bridging member (11).

3. The building connection (1) of claim 1 wherein:
a. a first substantially planar part (117) of the central portion (111) of the first body part (20) is dimensioned to conform to a substantially planar portion of the internal surface (71) of the first boundary flange (17) of the horizontal bridging member (11). and
b. a first substantially planar part (117) of the central portion (111) of the first body part (20) is dimensioned to conform to a substantially planar portion of the internal surface (71) of the first boundary flange (17) of the horizontal bridging member (11).

4. The building connection (1) of claim 3 wherein the central portion (111) of the first body part (20) is dimensioned to conform to adjacent portions of the internal surfaces (15) of the middle web (12), the internal surface (71) of the first boundary flange (17) and the internal surface (71) of the second boundary flange (17) of the horizontal bridging member (11).

5. The building connection (1) of claim 1 wherein:
a. the angle between the inside surface (115) of the central web portion (112) and the inside surface (118) of the first substantially planar border extension (117) is orthogonal; and
b. the angle between the inside surface (115) of the central web portion (112) and the inside surface (118) of the first substantially planar border extension (120) is orthogonal.

6. The building connection (1) of claim 1 wherein:
a. the first substantially planar lateral extension (124) has a first interior surface (125) and a first exterior surface (126);
b. the second substantially planar lateral extension (126) has a second interior surface (125) and a second exterior surface (126);
c. the angle between the outside surface (119) of the first substantially planar border extension (117) and the exterior surface (126) of the first substantially planar lateral extension (124) is orthogonal; and
d. the angle between the outside surface (119) of the second substantially planar border extension (117) and the exterior surface (126) of the second substantially planar lateral extension (124) is orthogonal.

7. The building connection (1) of claim 6 wherein:
a. a first side flange (35) is attached to the first side boundary (33) and a second side flange (35) is attached to the second side boundary (33);
b. the first side flange (35) has an inner surface (37) and an outer surface (38) opposite the inner surface (37);
c. the second side flange (35) has an inner surface (37) and an outer surface (38) opposite the inner surface (37);
d. the first side flange (35) of the bridging connector (2) interfaces with the central web (3) of the vertical wall stud (2);
e. the second side flange (35) of the bridging connector (2) interfaces with the central web of the vertical wall stud (2);
f. the first side flange (35) of the bridging connector (2) and the first boundary flange (17) of the bridging member (11) are at least partially nonparallel; and g. the second side flange (35) of the bridging connector (2) and the second boundary flange (17) of the bridging member (11) are at least partially nonparallel.

8. The building connection (1) of claim 7, wherein:
a. the bridging member (11) is inserted through a plurality of substantially vertical wall studs (2); and
b. the bridging connector (19) contacts the central web (3) of only one wall stud (2).

9. The building connection (1) of claim 1 wherein:
a. the outside surface (116) of the central web portion (112) is adjacent the internal surface (15) of the middle web (12) of the bridging member (11);
b. the outside surface (119) of the first border extension (117) is adjacent the internal surface (171) of the first boundary flange (17) of the bridging member (11); and
c. the outside surface (119) of the second border extension (120) is adjacent the internal surface (181) of the second boundary flange (17) of the bridging member (11).

10. The building connection (1) of claim 9 wherein:
a. the central web portion (112) of the bridging connector (19) includes a first fastening embossment (127) centered on a first fastener opening (82); and
b. the first fastener embossment (127) does not contact the middle web (12) of the bridging member (11).

11. The building connection (1) of claim 10 wherein only a single fastener (81) fastens the bridging connector (19) to the bridging member (11), and the single fastener (81) is inserted through the fastener opening (82) in the first fastening embossment (127).

12. The building connection (1) of claim 9, wherein:
a. the bridging member (11) is inserted through a plurality of substantially vertical wall studs (2); and
b. the bridging connector (19) contacts the central web (3) of only one wall stud (2).

13. The building connection (1) of claim 1, wherein:
a. the bridging member (11) is inserted through a plurality of substantially vertical wall studs (2); and
b. the bridging connector (19) contacts the central web (3) of only one wall stud (2).

14. A building connection (1) comprising:
a. a substantially vertical wall stud (2) having:
  i. a central web (3) having an opening (8);
  ii. a first side flange (9) integrally attached to the central web (3); and
  iii. a second side flange (9) integrally attached to the central web (3);
b. a substantially horizontal bridging member (11) inserted through the opening (8) of the central web (3) comprising:
  i. an at least partially planar middle web (12) having a first boundary (13) and a second boundary (13), an internal surface (15) and an external surface (16):
  ii. an at least partially planar first boundary flange (17) angularly joined to and extending from the middle web (12) at the first boundary (13), the first boundary flange (17) having an internal surface (71) and an external surface (72);
  iii. an at least partially planar second boundary flange (17) angularly joined to and extending from the middle web (12) at the second boundary (13), the second boundary flange (17) having an internal surface (71) facing toward the internal surface (71) of the first boundary flange (17) and an external surface (72) facing away from the external surface (72) of the first boundary flange (17); and
  iv. the first and second boundary flanges (17) of the bridging member (11) have first and second outer edges (75), respectively, that are mutually parallel;
C. a bridging connector (19) contacting the central web (3) of the wall stud (2) and fastened to the bridging member (11), the bridging connector (19) comprising:
  i. a first body part (20) having a first inner edge (23) and a first outer edge (101), wherein a rigid central portion (111) of the first body part (20) is dimensioned to conform to substantially planar portions of the internal surface (71) of the first boundary flange (17) and the internal surface (71) of the second boundary flange (17) of the horizontal bridging member (11), such that the first body part (20) makes at least two points of contact with the internal surface (71) of one of the first and second boundary flanges (17) and at least one point of contact with the internal surface (71) of the other of the first and second boundary flanges (17);
  ii. a first interior surface (21) and a first exterior surface (22) opposite the first interior surface (21), one of the first interior surface (21) and the first exterior surface (22) facing the bridging member (11);
d. wherein the first inner edge (23) has a first web interface portion (24) and a second web interface portion (24), the bridging connector (19) additionally comprising:
  i. a second body part (20) having a second interior surface (21), a second exterior surface (22) opposite the second interior surface (21), one of the second interior surface (21) and the second exterior surface (22) facing the bridging member (11), and a second inner edge (29) with a third web interface portion (24) and a fourth web interface portion (24); and
  ii. a neck (32) joining the first body part (20) to the second body part (20) between the first web interface portion (24) and the second web interface portion (24) of the first inner edge (23) and between the third web interface portion (24) and the fourth web interface portion (24) of the second inner edge (29); wherein:
    (a) the neck (32) passes through the opening (8) in the central web (3) of the wall stud (2);
    (b) the first web interface portion (24) and the second web interface portion (24) of the first inner edge (23) interface with the central web (3) of the wall stud (2);
    (c) the third web interface portion (24) and the fourth web interface portion (24) of the second inner edge (29) interface with the central web (3) of the wall stud (2).

15. The building connection (1) of claim 14 wherein a rigid central portion (111) of the second body part (20) is dimensioned to conform to adjacent portions of at least two of the internal surfaces (15, 71) of the middle web (12), the first boundary flange (17) and the second boundary flange (17) of the horizontal bridging member (11), such that the second body part (20) makes at least two points of contact with the internal surface (71) of one of the first and second boundary flanges (17) and at least one point of contact with the internal surface (71) of the other of the first and second boundary flanges (17).

16. The building connection (1) of claim 15 wherein the central portion (111) of the second body part (20) is dimensioned so that the central portion (111) of the second body part (20) can interface with the internal surfaces (71) of the first and second boundary flanges (17) of the bridging member (11) such that the bridging connector (19) is restrained from rotational movement on a vertical axis relative the bridging member (11) by the mechanical interlock between central portion (111) of the bridging connector (19) and the first and second boundary flanges (17) of the bridging member (11).

17. The building connection (1) of claim 15 wherein:
a. a first substantially planar part (117) of the central portion (111) of the second body part (20) is dimensioned to conform to a substantially planar portion of the internal surface (71) of the first boundary flange (17) of the horizontal bridging member (11); and
b. a second substantially planar part (117) of the central portion (111) of the second body part (20) is dimensioned to conform to a substantially planar portion of the internal surface (71) of the second boundary flange (17) of the horizontal bridging member (11).

18. The building connection (1) of claim 17 wherein the central portion (111) of the second body part (20) is dimensioned to conform to adjacent portions of the internal surfaces (15) of the middle web (12), the internal surface (71) of the first boundary flange (17) and the internal surface (71) of the second boundary flange (17) of the horizontal bridging member (11).

19. The building connection (1) of claim 15, wherein:
a. the bridging member (11) is inserted through a plurality of substantially vertical wall studs (2); and
b. the bridging connector (19) contacts the central web (3) of only one wall stud (2).

20. The building connection (1) of claim 15 wherein the central portion (111) of the second body part (20) comprises:
a. a central web portion (112) having a first border (113) and a second border (113), an inside surface (115) and an outside surface (116);
b. a first substantially planar border extension (117) joined to the first border (113), the first substantially planar border extension (117) having an inside surface (118) and an outside surface (119);
c. a second substantially planar border extension (117) joined to the second border (113), the second substantially planar border extension (120) having an inside surface (118) and an outside surface (119); wherein
  i. the central web portion (112) of the second body part (20) is angularly related to the first substantially planar border extension (117) and the substantially planar second border extension (120).

21. The building connection (1) of claim 20 wherein:
a. the angle between the inside surface (115) of the central web portion (112) of the second body part (20) and the inside surface (118) of the first substantially planar border extension (117) of the second body part (20) is orthogonal; and
b. the angle between the inside surface (115) of the central web portion (112) of the second body part (20) and the inside surface (118) of the second substantially planar border extension (120) of the second body part (20) is orthogonal.

22. The building connection (1) of claim 21 wherein:
a. the first substantially planar border extension (117) of the second body part (20) extends from the first border (113) to a first juncture (123);
b. the second substantially planar border extension (117) of the second body part (20) extends from the second border (113) to a second juncture (123);
C. the second body part (20) includes a first substantially planar lateral extension (124) that is joined to the first juncture (123) and extends past the first boundary flange (17) of the bridging member (11) to a first side boundary (33) of the second body part (20) of the bridging connector (19);
d. the second body part (20) includes a second substantially planar lateral extension (124) that is joined to the second juncture (124) and extends past the second boundary flange (17) of the bridging member (11) to a second side boundary (33) of the second body part (20) of the bridging connector (19);
e. the first border extension (117) of the second body part (20) is angularly related to the first substantially planar lateral extension (124) of the second body part (20); and
f. the second substantially planar border extension (117) of the second body part (20) is angularly related to the second substantially planar lateral extension (124) of the second body part (20).

23. The building connection (1) of claim 22 wherein:
a. the first substantially planar lateral extension (124) of the second body part (20) has a first interior surface (125) and a first exterior surface (126);
b. the second substantially planar lateral extension (126) of the second body part (20) has a second interior surface (125) and a second exterior surface (126);
c. the angle between the outside surface (119) of the first substantially planar border extension (117) of the second body part (20) and the exterior surface (126) of the first substantially planar lateral extension (124) of the second body part (20) is orthogonal; and
d. the angle between the outside surface (119) of the second substantially planar border extension (117) of the second body part (20) and the exterior surface (126) of the second substantially planar lateral extension (124) of the second body part (20) is orthogonal.

24. The building connection (1) of claim 23 wherein:
a. a first side flange (35) is attached to the first side boundary (33) of the second body part (20) and a second side flange (35) is attached to the second side boundary (33) of the second body part (20);
b. the first side flange (35) of the second body part (20) has an inner surface (37) and an outer surface (38) opposite the inner surface (37);
c. the second side flange (35) of the second body part (20) has an inner surface (37) and an outer surface (38) opposite the inner surface (37);
d. the first side flange (35) of the second body part (20) of the bridging connector (2) interfaces with the central web (3) of the vertical wall stud (2);
e. the second side flange (35) of the second body part (20) of the bridging connector (2) interfaces with the central web (3) of the vertical wall stud (2);
f. the first side flange (35) of the second body part (20) of the bridging connector (2) and the first boundary flange (17) of the bridging member (11) are at least partially nonparallel; and
g. the second side flange (35) of the second body part (20) of the bridging connector (2) and the second boundary flange (17) of the bridging member (11) are at least partially nonparallel.

25. The building connection (1) of claim 24, wherein:
a. the bridging member (11) is inserted through a plurality of substantially vertical wall studs (2); and
b. the bridging connector (19) contacts the central web (3) of only one wall stud (2).

26. The building connection (1) of claim 22, wherein:
a. the bridging member (11) is inserted through a plurality of substantially vertical wall studs (2); and b. the bridging connector (19) contacts the central web (3) of only one wall stud (2).

27. The building connection (1) of claim 20 wherein:

a. the outside surface (116) of the central web portion (112) of the second body part (20) is adjacent the internal surface (15) of the middle web (12) of the bridging member (11);

b. the outside surface (119) of the first substantially planar border extension (117) of the second body part (20) is adjacent the internal surface (171) of the first boundary flange (17) of the bridging member (11); and c. the outside surface (119) of the second substantially planar border extension (120) of the second body part (20) is adjacent the internal surface (181) of the second boundary flange (17) of the bridging member (11).

28. The building connection (1) of claim 27 wherein:

a. the central web portion (112) of the first body part (20) of the bridging connector (19) includes a first fastening embossment (127) centered on a first fastener opening (82); and b. the first fastener opening (82) does not contact the middle web (12) of the bridging member (11).

29. The building connection (1) of claim 28 wherein only a single fastener (81) fastens the bridging connector (19) to the bridging member (11), and the single fastener (81) is inserted through the fastener opening (82) in the first fastening embossment (127).

30. The building connection (1) of claim 27, wherein:

a. the bridging member (11) is inserted through a plurality of substantially vertical wall studs (2); and b. the bridging connector (19) contacts the central web (3) of only one wall stud (2).

31. The building connection (1) of claim 14, wherein:

a. the bridging member (11) is inserted through a plurality of substantially vertical wall studs (2); and b. the bridging connector (19) contacts the central web (3) of only one wall stud (2).

\* \* \* \* \*

UNITED STATES PATENT AND TRADEMARK OFFICE
CERTIFICATE OF CORRECTION

PATENT NO. : 9,732,520 B2
APPLICATION NO. : 13/845057
DATED : August 15, 2017
INVENTOR(S) : Larry Randall Daudet and Jin-Jie Lin Page 1 of 1

It is certified that error appears in the above-identified patent and that said Letters Patent is hereby corrected as shown below:

In the Specification

Column 5, Line 20, referencing: "a first outer edge 101. Preferably, a rigid central portion 11"
Should be corrected to read: --a first outer edge 101. Preferably, a rigid central portion 111--;
Column 5, Lines 37-38, referencing: "130 and a second straight borderline 130. Preferably, the first and second outer edges 75 of the first and second boundary"
Should be corrected to read: --130 and a second straight borderline 130. Preferably, the first and second borderlines 130 are mutually parallel and have a spacing that matches that of the first and second outer edges 75 of the first and second boundary--.

In the Claims

Column 12, Line 14, referencing: "the horizontal bridging member (11). and"
Should be corrected to read: --the horizontal bridging member (11); and--;
Column 12, Line 15, referencing: "a first substantially planar part (117) of the central"
Should be corrected to read: --a second substantially planar part (117) of the central--;
Column 12, Line 18, referencing: "internal surface (71) of the first boundary flange (17) of"
Should be corrected to read: --internal surface (71) of the second boundary flange (17) of--;
Column 12, Line 34, referencing: "first substantially planar border extension (120) is"
Should be corrected to read: --second substantially planar border extension (120) is--;
Column 12, Line 63, referencing: "interfaces with the central web of the vertical wall stud"
Should be corrected to read: --interfaces with the central web (3) of the vertical wall stud--.

Column 13, Line 13, referencing: "b. the outside surface (119) of the first border extension"
Should be corrected to read: --b. the outside surface (119) of the first substantially planar border extension--;
Column 13, Line 17, referencing: "c. the outside surface (119) of the second border extension"
Should be corrected to read: --c. the outside surface (119) of the second substantially planar border extension--.

Signed and Sealed this
Fourteenth Day of August, 2018

Andrei Iancu
*Director of the United States Patent and Trademark Office*